H. FRANZEN.
RUNNER FOR SICKLE BARS.
APPLICATION FILED DEC. 15, 1920.
1,391,181. Patented Sept. 20, 1921.
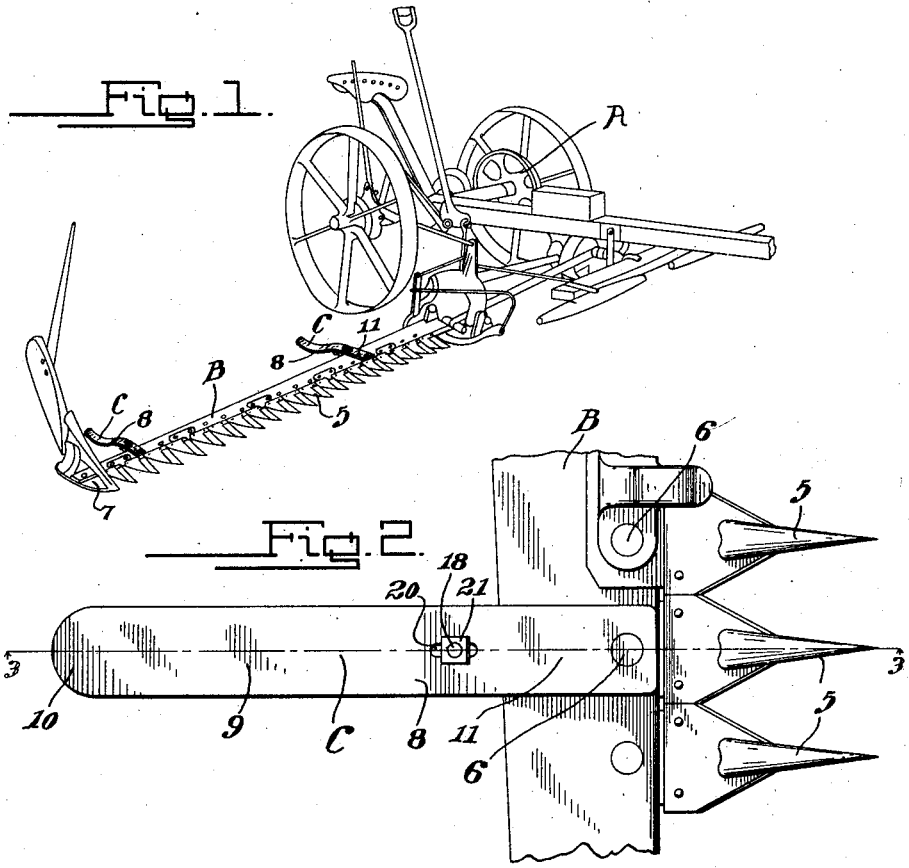
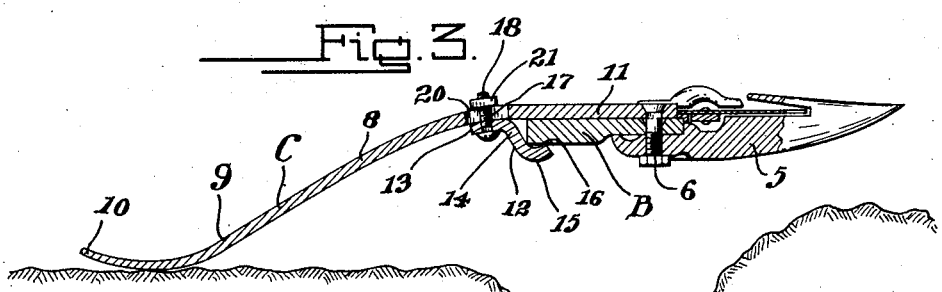
Inventor
Harm Franzen.

UNITED STATES PATENT OFFICE.

HARM FRANZEN, OF PHOENIX, ARIZONA.

RUNNER FOR SICKLE-BARS.

1,391,181.      Specification of Letters Patent.    Patented Sept. 20, 1921.

Application filed December 15, 1920. Serial No. 430,933.

*To all whom it may concern:*

Be it known that I, HARM FRANZEN, a citizen of the United States, residing at Phoenix, in the county of Maricopa and State of Arizona, have invented certain new and useful Improvements in Runners for Sickle-Bars, of which the following is a specification.

This invention relates to attachments for mowing machines and the like, which embodies a swinging cutter bar, and is an improvement on my patented application issued to me Feb. 1st 1921, Patent No. 1,367,367 and the primary object of the present invention is to provide an improved runner for mowing machines adapted to be carried by the cutter bar thereof intermediate the usual supporting shoes, which can be secured to any size cutter bar, thereby permitting the runner to be used with all types and makes of mowing machines.

A further object of the invention is to provide an improved runner for supporting the cutter bars of mowing machines embodying a rearwardly extending arcuate resilient plate, and an attaching foot for engaging one face of the cutter bar, and an adjustable finger for engaging the opposite face of the cutter bar, the adjustable finger forming a novel and convenient means for attaching the runner to all widths and thickness of cutter bars.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a perspective view of a mowing machine provided with the improved runners.

Fig. 2 is a fragmentary plan view of a cutter bar showing an improved runner applied thereto, and Fig. 3 is an enlarged detail transverse section through the cutter bar and improved runner taken on the line 3—3 of Fig. 2, illustrating the clamping finger carried by the improved runner.

Referring to the drawings in detail, wherein similar reference characters designate corresponding parts throughout the several views, the letter A indicates a mowing machine of the ordinary or any preferred type, including the usual cutter bar B, which has associated therewith the improved runners C. The cutter bar B of the mowing machine A is provided with the usual outwardly extending guard fingers 5, which are secured to the cutter bar in the ordinary manner by bolts 6, and the cutter bar is provided at its terminals with the usual supporting shoes or runners 7.

The improved runners C are preferably used in pairs as shown in Fig. 1. of the drawings, although it is to be understood that a single runner C may be used with each cutter bar if so desired.

When a pair of the runners C are utilized, one of the same is arranged adjacent to the outer end of the cutter bar and the other is arranged adjacent to the inner end of the cutter bar. These runners C are adapted to project rearwardly and downwardly from the cutter bar B and are adapted to support the cutter bar, when the usual shoes 7 ride into a ditch or other irregularity formed in the surface of the ground over which the mowing machine is operated, so as to carry the cutter bar above the ditch and thus prevent the teeth 5 from digging into the ground. Each of the runners C includes a relatively narrow elongated body 8, formed of any material, but preferably of resilient steel. The elongated body 8 includes the downwardly and rearwardly arcuately extending portion 9, which has its outer end bent upwardly slightly, as indicated by the numeral 10. If so desired, the body 7 may be gradually decreased in thickness toward its outer or free end so as to enhance the resiliency thereof.

The inner end of the elongated body 8 is provided with a forwardly extending substantially horizontally disposed attaching foot 11, which as shown in the drawings, is adapted to be placed in abutting relation to the upper face of the cutter bar B, directly above one of the guard teeth 5. The attaching foot 11 is adapted to be secured to the cutter bar B by means of a removable bolt, and as shown in Figs. 2 and 3 of the drawings, the same bolts utilized for connecting the teeth 5 to the cutter bar B may be utilized for holding the runner in place. It is to be understood, however that other bolts may be employed if so desired. A clamping member 12 is adapted to engage the face of the cutter bar opposite to the face engaged by the attaching portion 11, and forms an additional support for the runner so as to prevent undue strain on the attaching bolt of the attaching foot.

If desirable the foot 11 may be placed in engagement with the lower face of the cutter bar and the clamping member placed in engagement with the upper face of the cutter bar. This is directly opposite to what is shown in Figs. 2 and 3, and it can be seen that the cutter bar will be positioned a little higher from the ground, when the foot 11 is placed in engagement with the lower face of the cutter bar than when it is placed in engagement with the upper face of the cutter bar.

This clamping member 12 is adjustably mounted upon the runner, so as to permit the runner to be connected to all widths and thicknesses of cutter bars, so that the device can be connected to all makes of mowing machines. As shown, this clamping member 12 includes the right angularly disposed attaching portion 13 for engaging the runner, the forwardly and downwardly extending body portion 14 and the cutter bar engaging portion 15. If so desired the cutter bar engaging portion 15 may be provided with a sharpened biting tooth 16 for firmly engaging the lower surface of the cutter bar. The runner engaging portion 13 is provided with an opening 17 for the reception of an attaching bolt 18, which is arrange in a longitudinally extending slot 20 formed in the runner C. A suitable locking nut 21 is threaded upon the attaching bolt 18, and forms means for holding the clamping member 12 in position.

It can be seen that by loosening the nut 21 and sliding the bolt 18 within the slot 20, the clamping member can be adjusted toward and away from the cutter bar B, so that different widths of cutter bars may be accommodated. It also can be seen that by adjusting the nut 21 upon the shank of the bolt 18, the member 12 may be adjusted toward and away from the runner, so as to accommodate various thicknesses of cutter bars.

Thus, the improved runner can be attached to all makes of mowing machines.

In some types of mowing machines, the cutter bar is gradually tapered toward its outer end, and the arrangement of the runner C and the clamping member 12, permits the runner to be attached at any position along the cutter bar.

In use the improved runner, the same being positioned intermediate the shoes 7 and in rear thereof, effectively supports the cutter bar when the ordinary shoe rides into a ditch, thereby preventing the guard fingers from digging into the ground and becoming broken. The runners are also particularly adapted for use on fields on which the ground is broken or irregular, and as clearly shown in Fig. 3, when the ordinary shoe or guard rides into a depressed portion of the ground, the improved runner C will support the cutter bar until the shoe rides out of the same.

Changes in details may be made without departing from the spirit or scope of the invention; but,

I claim:

1. In a mowing machine, the combination of a cutter bar, of a runner attachment therefor including an attaching foot for engaging one face of the cutter bar, a fastening element arranged to extend through the said foot and cutter bar, said runner having a slot therein, a clamp for engaging the face of the cutter bar opposite to the face engaged by the attaching foot, and an adjusting bolt carried by the clamp and slidably mounted in said slot.

2. In a mowing machine, the combination with a cutter bar having a plurality of teeth, of a runner attachment therefor including an arcuate rearwardly extending and depending body, and an attaching foot for engaging the upper face of the cutter bar, a bolt extended through the foot, the cutter bar, and one of the said teeth, a forwardly extending clamping member arranged to engage the lower face and rear edge of the cutter bar, and an adjusting bolt carried by the clamping member and the runner in rear of said attaching foot.

3. A runner comprising a flat elongated narrow body including a downwardly and rearwardly curved portion, and a forwardly extending attaching foot, the body having a longitudinally extending slot formed therein adjacent to the attaching foot, a clamping member including a forwardly and downwardly extending portion, and a rearwardly extending body engaging portion, the body engaging portion having an opening therein, a bolt extended through said opening and slot, and a nut threaded on said bolt.

4. A runner comprising a flat elongated narrow body including a downwardly and rearwardly curved portion and a forwardly extending attaching foot, the body having a longitudinally extending slot formed therein adjacent to the attaching foot, a clamping member including a forwardly and downwardly extending portion and a rearwardly extending body engaging portion, the body engaging portion having an opening therein, a bolt extended through said opening and slot, a nut threaded on said bolt, and a biting tooth formed on the forward end of said clamping member.

HARM FRANZEN.